United States Patent [19]
Baker et al.

[11] Patent Number: 6,073,089
[45] Date of Patent: Jun. 6, 2000

[54] SYSTEMS AND METHODS FOR ADAPTIVE PROFILING, FAULT DETECTION, AND ALERT GENERATION IN A CHANGING ENVIRONMENT WHICH IS MEASURABLE BY AT LEAST TWO DIFFERENT MEASURES OF STATE

[76] Inventors: Michelle Baker, 325 Riverside Dr., Apt #123, New York, N.Y. 10025; Thomas A. Ryan, 1448 W. Park Hills Ave., State College, Pa. 16803

[21] Appl. No.: 08/956,227

[22] Filed: Oct. 22, 1997

Related U.S. Application Data

[60] Provisional application No. 60/029,147, Oct. 22, 1996.

[51] Int. Cl.[7] .................................................. G06F 9/00
[52] U.S. Cl. ............................ 702/185; 73/116; 714/25
[58] Field of Search ................... 702/163–185, 702/45, 130; 371/25.1, 25.2; 73/117.3, 116; 714/25

[56] References Cited

U.S. PATENT DOCUMENTS

| | | | |
|---|---|---|---|
| 5,113,489 | 5/1992 | Cihiwsky | 395/113 |
| 5,200,126 | 4/1993 | Wenkus | 264/40.1 |
| 5,446,664 | 8/1995 | Vossen | 364/431.03 |
| 5,481,548 | 1/1996 | Wallace | 371/20.1 |
| 5,487,753 | 1/1996 | MacCarter | 607/17 |
| 5,497,335 | 3/1996 | Hoeller | 364/470 |
| 5,505,079 | 4/1996 | Rossignol | 73/117.3 |
| 5,544,138 | 8/1996 | Bajorek | 369/54 |
| 5,570,300 | 10/1996 | Henry et al. | 702/85 |
| 5,574,217 | 11/1996 | McCombie | 73/116 |

OTHER PUBLICATIONS

Maxion & Feather, "A Case Study of Ethernet Anomalies in a Distributed Computing Environment", Oct. 1990, *IEEE Transactions on Reliability*, vol.39, No. 4, pp. 433–443.

Lin & Siewiorek, "Error Log Analysis: Statistical Modeling and Heuristic Trend Analysis", Oct. 1990,*IEEE Transactions on Reliability*, vol.39, No. 4, pp. 419–432.

Sng, "Network Fault Monitoring and Fault Detection on the University of Illinois at Urbana–Champaign Campus Computer Network", Apr. 1990, Report UIUCDCS–R–90–1595.

Boulantis, "Modeling Fault Management in Communication Networks", 1990, Ph.D. Thesis, Columbia University, technical report CU/CTR/TR 174–90–04.

Kiernan, "Net management from an Alarming point of view", *TE&M*, Mar. 1, 1991,pp. 64–67.

(List continued on next page.)

*Primary Examiner*—Kamini Shah
*Attorney, Agent, or Firm*—David P. Gordon

[57] ABSTRACT

Systems and methods for detecting changes, and in particular faults, in a changing environment include constructing a profile of the environment using observations made during no fault conditions. A range of values for one or more "trusted" variables are identified as values indicative of a no fault condition. Data is also collected (only at times when the trusted variable(s) indicate(s) no fault) for other variables which may be indicative of a fault condition. Statistical profiles are established for each of these other variables. The environment is continuously monitored and the normal profile, as well as the thresholds/ranges, are preferably continuously updated during normal conditions, as indicated by the trusted variable(s). When, during monitoring of the environment, the trusted variable(s) exhibit value(s) outside the normal range, a possible fault condition is indicated and the present values of the other variables are examined to determine whether or not any of these variables exhibit values outside the normal profiled thresholds/ranges. Depending on which of these variables exhibits an abnormal value, a diagnosis of the fault may be possible. A method for determining the accuracy of trusted and fault variables is also disclosed.

20 Claims, 6 Drawing Sheets

Microfiche Appendix Included
(1 Microfiche, 59 Pages)

OTHER PUBLICATIONS

Kim, "Defense Data Network Management System",Proceedings of the 16th Annual Conference on Local Area Networks, IEEE Press, 1991, pp. 375–377.

Hansen, "The Use of Multidimensional Parametric Behavior of a CSMA/CD Network for Network Diagnosis",Ph.D. Thesis, Carnegie Mellon University, technical report CMUCDS92–3. May 7, 1992.

Goldberg, "Adaptive Fault–Resistant Systems", SRI International, Computer Science Lab. technical report, SRI–CSL–95–02, Jan. 1995.

Triticom, "Ether–Vision–Ethernet LAN Monitor",http:www.triticom.com.1995.

Norton, "NetLabs Dimons Lab Notes, NetView/6000 Notes, Hewlett Packard Openview Lab Notes, Sun Connect SunNet Manager Lab Notes, Cabletron Sprectum Notes", (from WWW..address lost)wbn@merit.edu. No date.

SYSTEMS AND METHODS FOR ADAPTIVE PROFILING, FAULT DETECTION, AND ALERT GENERATION IN A CHANGING ENVIRONMENT WHICH IS MEASURABLE BY AT LEAST TWO DIFFERENT MEASURES OF STATE

This application claims the benefit of provisional application Ser. No. 60/029,147 filed Oct. 22, 1996.

The U.S. Government has a paid-up non-exclusive license in this invention as provided for by Grant No. DMI-9460927 awarded by the National Science Foundation.

BACKGROUND OF THE INVENTION

1. Field of the Invention

The invention relates to fault detection and fault identification in a complex environment. More particularly, the invention relates to systems and methods for profiling "normal conditions" in a complex environment, for automatically updating the profiles of "normal conditions", for automatically detecting faults based on the "normal conditions" profiles, and for identifying faults in environments which are measurable by multiple variables.

2. State of the Art

Automated alert generation based on profiles of normal behavior has been known for many years. A profile of normal behavior is generated by collecting data about a environment over time and normalizing the data. The data collected represents the state of the environment at different times whether or not a fault condition exists. It is implicitly assumed that, over time, the number of observations made at times when faults are present will be small relative to the number of observations made at times when no faults are present; and that the normalized value of the data sets will be a fair indicator of the state of the environment when no faults are present. New observations of the environment may then be compared to the profile to make a determination of whether a fault exists.

In the case of volume processing systems (or environments), it has always been assumed that faults are more likely to occur when the environment is operating under high volume conditions and data collection for generating a profile of normal conditions is best accomplished during low volume conditions.

A commonly known volume processing environment in which fault detection is critical is a telecommunications network such as the internet. Faults in the internet may occur at particular devices which are connected to the network. The Internet Protocol (IP) provides certain diagnostic tools for determining the state of the network at different times. For example, the Simple Network Management Protocol (SNMP) requires that devices maintain statistics about their processing status and history as specified in the Management Information Bases I and II (MIB I and MIB II-Internet RFCs 1156 and 1158) and in the Remote Monitoring Management Information Base (RMON MIB-Internet RFC 1757).

Research on techniques for automated diagnosis of faults in computer networks can be separated into work on fault diagnosis and work on fault detection. Whereas the objective of fault diagnosis is to identify a specific cause or causes for a problem, fault detection methods seek only to determine whether or not a problem exists. Fault detection methods do not necessarily result in a specific identification of the cause of the problem. Research on alert correlation is a form of fault diagnosis in which an attempt is made to group a multiplicity of incoming alerts according to the specific problem that caused them to be generated. A great deal of attention has been directed to this problem by both industry and academics. See, e.g., J. F Jordan and M. E. Paterok, *Event Correlation in Heterogeneous Networks Using the OSI Management Framework*, Proceedings of the TISINM International Symposium on Network Management, San Francisco, Calif., 1993. Many other techniques for addressing the problem of automated fault diagnosis have been proposed over the last decade including rule-based systems, case-based systems, and neural network based systems.

There have also been many attempts to develop techniques to automate fault detection using data from computer networks. Most techniques rely on statistical profiles of normal behavior that are compared against actual behavior in order to detect anomalies. See, e.g., D. Sng, *Network Monitoring and Fault Detection on the University of Illinois at Urbana-Champaign Campus Computer Network*, Technical Report, University of Illinois at Urbana-Champaign, 1990. Sng examined SNMP data for purposes of profile generation but did not account for time-varying behavior of the networks and computed a single static threshold value using the mean and standard deviation continuously computed over a window of days. Sng discusses the issue of error periods biasing sample observations and suggests that infrequent bursty errors will migrate out of the sample rapidly as long as the sample window is small. However, this implies that much of the time normal profiles will be extremely biased, particularly since with small sample windows, error observations will periodically dominate.

More sophisticated techniques have been applied in order to automatically generate profiles and detect faults in computer networks. See, e.g., R. Maxion and F. Feather, *A Case Study of Ethernet Anomalies in a Distributed File System Environment*, IEEE Transactions on Reliability, 39(4):433-43, 1990; F. Feather, *Fault Detection in an Ethernet Network via Anomaly Detectors*, Ph.D. Dissertation, Carnegie Mellon University, 1992; and J. Hansen, *The Use of Multi-Dimensional Parametric Behavior of a CSMA/CD Network for Network Diagnosis*, Carnegie Mellon University, 1992.

Feather used custom, passive hardware monitors on the Computer Science Department ETHERNET network at Carnegie Mellon University to gather data over a seven month period. Raw data were collected for packet traffic, load, collisions, and packet lengths using a sampling interval of 60 seconds. In this work, profiles and thresholds were computed from the data using moving average techniques in which a profile, visualized as a plot of expected behavior over a 24 hour period, was computed for each variable that had been collected. Maxion and Feather used an exponentially weighted moving average to develop profiles. In this scheme, the profile value for each time point is a weighted average of the values of the same point on previous days, with the weights decreasing exponentially so that older points have the least weight. The form of the weights, where a is the smoothing parameter which lies between 0 and 1, is: $a, a(a-1), a(a-1)^2, a(a-1)^3, \ldots$ Using these techniques, a new profile is computed every 24 hours.

Hansen developed an alternative algorithm for multivariate time series analysis of the same network data used by Feather. He compared the fault diagnosis performance of human non-expert subjects using graphical display software with that of the multivariate measures and found that the humans performed better in detecting obvious fault situations whereas the measures were better in detecting non-obvious faults. He also compared the performance of his algorithm with that of Feather's feature vector algorithm and found similar performance.

Much of the research on alert correlation and proactive network management have been conducted in industry and use techniques closely related to those pioneered by Feather and Maxion. Products available from companies such as Hewlett Packard, IBM, and Cisco support baseline characterization of network behavior by gathering statistics and allowing thresholds to be set in a manner similar to that explored by Maxion and Feather.

It is well known, however, that the present methods of defining a profile of normal behavior have not resulted in accurate fault detection, particularly in communications networks. In addition, little progress has been made in automatically generating an accurate profile of normal conditions in an environment which is subject to rapid changes in configurations. Further, all of the systems proposed for automatic fault detection in communication networks require the accumulation of relatively large data sets in order to form a system profile. Most systems attempt to improve accuracy by generating separate profiles for a number of time periods, e.g. each hour, over a time cycle, e.g. 24 hours. In some systems, separate sets of profiles are maintained for weekdays, weekends, and holidays.

SUMMARY OF THE INVENTION

It is therefore an object of the invention to provide systems and methods for generating and maintaining an accurate profile of normal conditions in a complex environment.

It is also an object of the invention to provide systems and methods for automatically detecting faults based on a profile of normal conditions in a complex environment.

It is another object of the invention to provide systems and methods for automatically generating alerts when faults are detected based on a profile of normal conditions in a complex environment.

It is still another object of the invention to provide systems and methods for identifying faults based on a profile of normal conditions in a complex environment.

It is yet another object of the invention to provide systems and methods for efficiently generating and maintaining an accurate profile of normal conditions in a complex environment without requiring an unduly large number of data sets.

Another object of the invention is to provide methods for determining the accuracy of profiles and indicators of normal conditions in complex environments.

In accord with these objects which will be discussed in detail below, the systems and methods of the present invention are based on three unexpected discoveries about which the prior art teaches away: i.e. that in order to build an accurate profile of normal conditions in a environment, it is important to collect data only when no fault conditions exist; that there is a characteristic relationship between a measure of normal conditions and a measure of fault conditions; and that in volume processing environments, faults are more likely to be present when the environment is operating at low volume. The present invention was conceived in response to the recognition that the current techniques for alert generation that are based on automatically generating and updating profiles are inaccurate because they are based on averaging techniques that combine observations from situations in which there are faults with those from situations in which the environment is trouble free. Detection methods based on profiles built in this manner cannot be made sensitive because the profile is always biased and profile variance is relatively large. It has been discovered that a profile is much more accurate if data collected during a fault condition is eliminated from the population of data used to create the profile. Moreover, contrary to the assumption that high volume (in a volume environment such as a communications network) is a source of faults, it has been discovered that high volume is a symptom of a no fault condition. Therefore, in accord with the invention, profiles are built from data which is taken only during high volume conditions (or in the case of environments other than volume environments, only during conditions which are proven to be indicative of no fault).

According to a generalized model of the systems and methods of the invention, a profile is made of the environment using observations made during no fault conditions. A range of values for one or more "trusted" variables are identified as values indicative of a no fault condition. Data is also collected (only at times when the trusted variable(s) indicate(s) no fault) for other variables which may be indicative of a fault condition. Statistical profiles are established for each of these other variables. In a simple implementation, profiles are made by averaging observations and maintaining a mean value and standard deviation for each variable. The environment is continuously monitored and the normal profile(s), as well as the thresholds/ ranges of the trusted variable(s), are preferably continuously updated during normal conditions, as indicated by the trusted variable(s). When, during monitoring of the environment, the trusted variable(s) exhibit value(s) outside the normal range, a possible fault condition is indicated and the present values of the other variables are examined to determine whether or not any of these variables exhibit values outside the normal profiled thresholds/ranges. Depending on which of these variables exhibits an abnormal value, a diagnosis of the fault may be possible.

According to a first exemplary embodiment of the invention, a system is provided to detect faulty behavior of one or more devices in a communications network. The normal profile is built with data observations acquired during high processing volume, a condition discovered to be indicative of the absence of faults. One or more fault thresholds are derived from statistical profiles made from observations made during high volume conditions. It is readily recognized that, in this exemplary embodiment, low processing volume is not necessarily indicative of the presence of a fault. Thus, a fault alert is generated during lowered processing volume only when one of the normal profiled thresholds is exceeded.

According to other embodiments of the invention, normal profiles are built for a variety of complex environments in which there are at least two different measurable variables, one being a priori indicative of normal conditions (the trusted variable) and the other(s) being statistically indicative of a fault (the fault variable(s)). The trusted variable may include a number of variables which are combined in different ways depending on the environment and the fault thresholds likewise may be each built from a number of related variables which are indicative of a particular fault. In each case, the trusted variable(s) is monitored for deviation from normal, the normal profile is preferably adaptively updated during normal conditions, and the fault thresholds are examined only when the trusted variable(s) deviates from the normal profile.

According to the invention, when one measure of environment status (the trusted variable) can be used to detect fault-free operation, it can also be used as a switch to filter sampled observations of one or more other measures of environment status. Observations that have passed through the filter can then be used to estimate the profile of normal behavior for one or more other measures of environment status. This greatly improves the accuracy and sensitivity of fault detection methods based on automatic profile generation. It acts to remove inaccuracies which result from mixing sample points from both fault-free and faulty conditions and treating them identically when constructing a statistical profile of normal behavior for a measure of environment status.

Another feature of the invention is that it includes a technique for determining the reliability of a trusted variable for identifying a specific state of a target variable such as a variable believed to be effective for fault detection. When plotted against the values of the trusted variable, the target variable should reveal a pattern of very low variance over some range of the trusted variable. If a low variance region does not appear in the plots either the trusted variable is faulty or the proposed measure is insufficiently related to the target state (or its inverse).

In addition to fault detection and alert generation, the systems and methods of the invention are applicable to control and regulation of an apparatus in response to environmental changes.

Additional objects and advantages of the invention will become apparent to those skilled in the art upon reference to the attached appendices.

Figure 1:
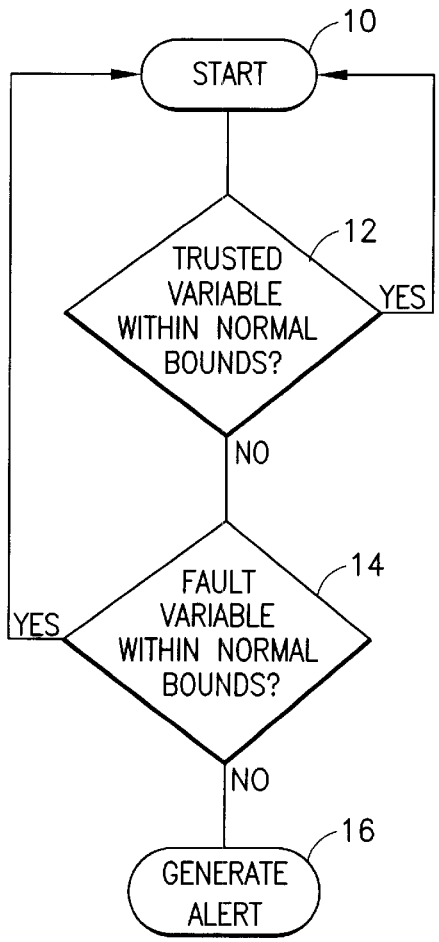
FIG. 1 is a simplified flow chart of the generalized operation of the systems and methods of the invention.

This application contains one microfiche and 59 frames of computer program listings.

BRIEF DESCRIPTION OF THE APPENDICES

Microfiche Appendix A is a report to the NSF regarding an application of the invention for fault detection in a communications network (30 pages);

Microfiche Appendix B is a collection of graphs illustrating SNMP and RMON error rates in relation to network traffic (7 pages); and Microfiche Appendix C is a source code listing of an exemplary embodiment of the invention (18 pages).

DETAILED DESCRIPTION OF THE PREFERRED EMBODIMENTS

As mentioned above, according to a generalized model of the systems and methods of the invention, a profile is made of the environment using observations made during no fault conditions. A range of values for one or more "trusted" variables are identified as values indicative of a no fault condition. In other words, whenever the trusted variable is above a threshold or within a range, for example, it is most likely or perhaps assured that there is no fault in the environment. It must be noted, however, that the converse proposition, "whenever the trusted variable is below the threshold or outside the range, there is a fault in the environment" is not necessarily true and is usually not true. Thus, the trusted variable is a one-way indicator, only indicating the absence of a fault, but incapable, in and of itself, of indicating the presence of a fault. One may view the trusted variable as indicating a condition precedent for a fault, since so long as the trusted variable is above threshold or within range, there is no fault condition.

According to the generalized model of the invention, observations in the form of measurable data are collected only at times when the trusted variable indicates no fault. A profile is created for the environment which includes the bounds of the trusted variable and the bounds observed for other variables during times of no-fault conditions as indicated by the trusted variable. In most cases, the trusted variable will be chosen based on a priori knowledge of the environment. For example, one may postulate that gas mileage is a trusted variable for determining whether an automobile has a faulty engine. The trusted variable may be self-evident or it may be learned from observation. As mentioned above, and as described in more detail below, one of the discoveries of this invention is that high volume in a communications network is an indicator that there are no faults in the network. That given, it will be appreciated that low volume in the network does not necessarily indicate that there is a fault in the network. Low volume may be caused by other factors which are not faults. For example, certain times of day or times of year may normally yield low volume in the environment. A key aspect of the present invention, is, however, that the profile of the environment be derived from observations made only when the trusted variable gives assurance that no fault exists. When this is done, the profile will contain "acceptable" values for different measurements of the environment. In other words, the profile will reflect what the environment looks like when we know that it is not faulty. Once the profile has been built in this way, the fault detection process can begin an iterative examination of the environment. A simplified model of the fault detection process is shown in FIG. 1.

Turning now to FIG. 1, the fault detection process starts at 10 and proceeds to examine the trusted variable at 12 for the last data observation. If it is determined at 12 that the trusted variable is within the bounds (or above or below the threshold, depending on the environment and the variable) indicative of no fault, the process returns to 10 and then to examine the trusted variable at 12 for the next instant in time. If it is determined at 12 that the trusted variable no longer indicates a fault-free environment, another variable (measure of the environment) is examined at 14 to determine whether its value is within the range set forth in the no-fault environment profile. If it is determined at 14 that the "fault variable" is within normal limits, the process returns to 10 to begin the testing again at the next instant in time. If the fault variable shows a value at 14 which is outside the normal profile, an alert is generated at 16 and it is assumed that a fault has been detected.

Those skilled in the art will appreciate that the process shown in FIG. 1 is greatly simplified since there will typically be many fault variables. In the process shown in FIG. 1 where only one fault variable is present, the examination of the trusted variable may be considered trivial since it adds an extra step to fault detection. It will be understood, however, that in a environment having a profile with many fault variables, the examination of the trusted variable in the fault detection process will actually make the fault detection system much more efficient since none of the fault variables need be examined until the trusted variable indicates the possibility of a fault.

Figure 2:
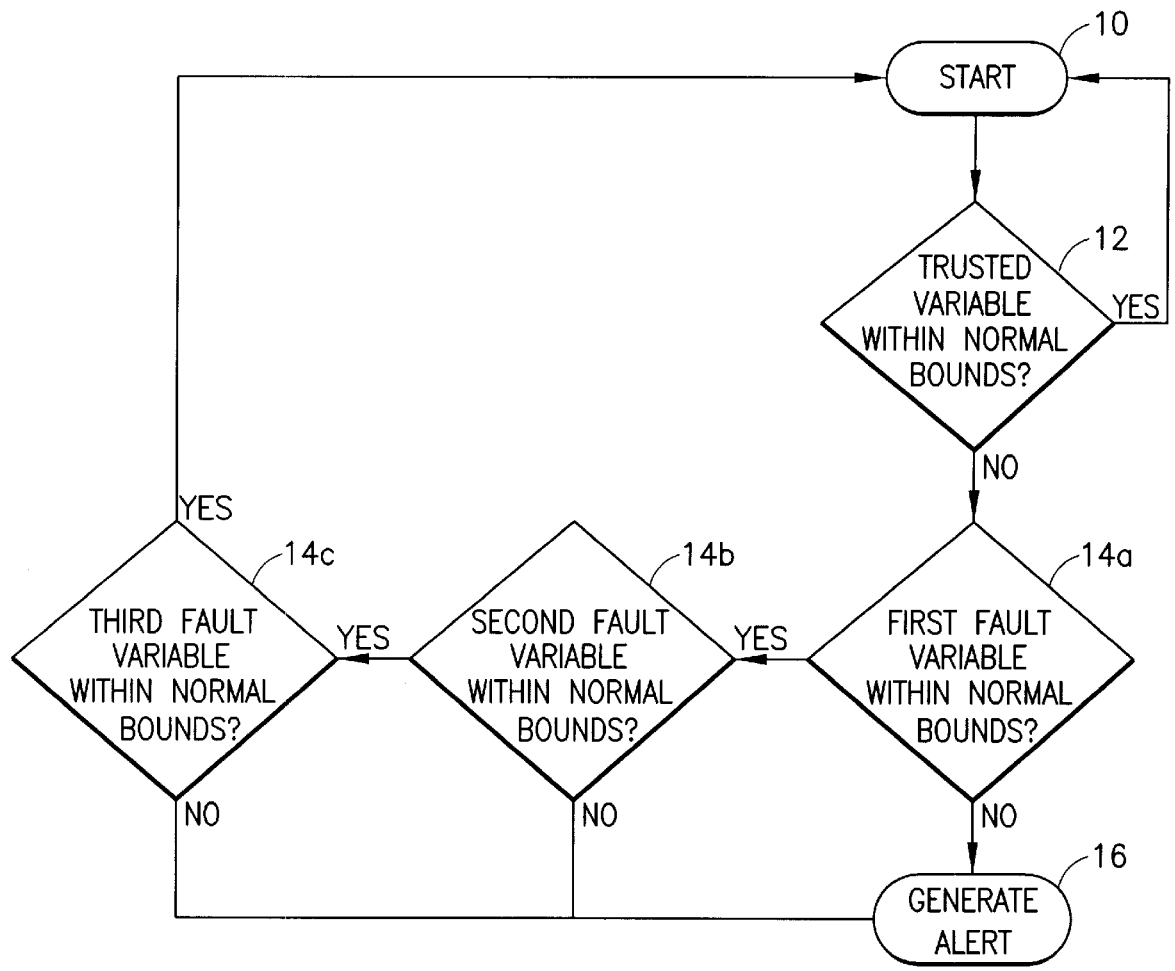
FIG. 2 is a simplified flow chart of the generalized operation of the systems and methods of the invention where several fault variables are profiled.

Referring now to FIG. 2, the fault detection process starts at 10 and proceeds to examine the trusted variable at 12 for the present instant in time as in the example described above with reference to FIG. 1. If it is determined at 12 that the trusted variable no longer indicates a fault-free environment, multiple fault variables are examined at 14a, 14b, 14c, etc. to determine whether their values are within the ranges set forth in the no-fault environment profile. If it is determined at any one of 14a, 14b, 14c, etc. that a "fault variable" is outside the normal profile, an alert is generated at 16 and it is assumed that a fault has been detected. FIG. 2 shows the fault variables 14a, 14b, 14c, etc. being examined in sequence. However, it may be desirable in some environments to examine all or some of the fault variables simultaneously or to continuously examine all of the fault variables after one is found to be outside of its normal bounds. In addition, the generation of the alert at 16 may be fault-specific depending on which of the fault variables indicated the fault. Thereby, the system may be operated to provide not only a fault detection, but a fault diagnosis as well.

Figure 3:
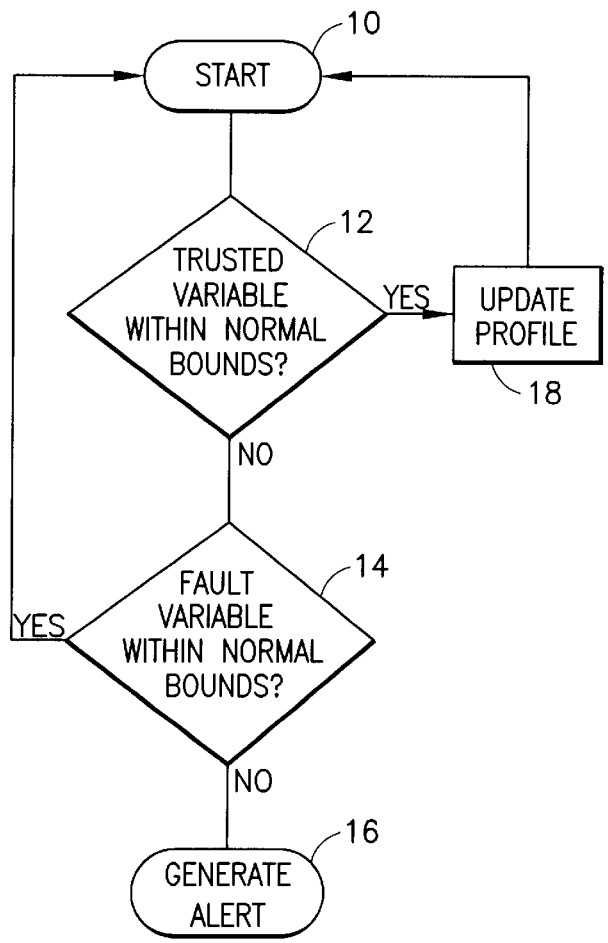
FIG. 3 is a simplified flow chart of the generalized operation of the systems and methods of the invention including adaptive profiling.
Figures 4, 5:
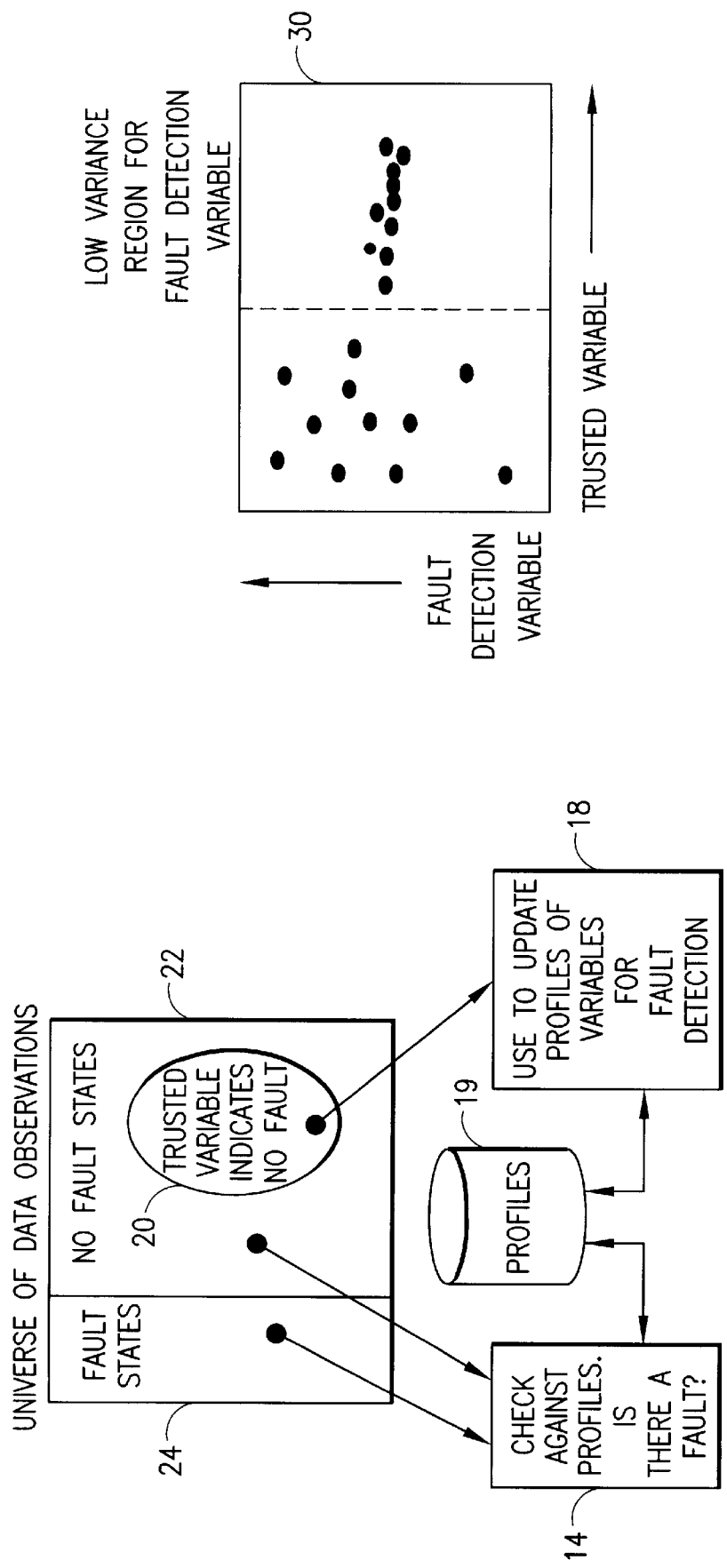
FIG. 4 is a schematic diagram of the relationship between trusted variables and fault variables and how environment profiles are updated.
FIG. 5 is a schematic representation of the statistical variance of trusted variable(s) and fault detection variables.

Turning now to FIGS. 3 and 4, the systems and methods of the invention preferably include the adaptive updating of the environment profile (i.e. profiles of the trouble free range of one or more fault detecting variables). Thus, as shown in FIG. 3, each time the trusted variable indicates a no fault state of the environment at 12, the profiles of the fault detection variables are updated at 18. The operation of the system shown in FIG. 3 is otherwise the same as described above with reference to FIG. 1 and the same reference numerals are used to indicate the same steps in the system. FIG. 4 shows another way of representing the system shown in FIG. 3 and which indicates the relationship between the trusted variable(s) and the fault detection variables. The profiles 19 shown in FIG. 4 are updated at 18 each time the trusted variable (s) are within the range 20 indicative of no fault in the environment. When sampling of the trusted variable(s) shows a value outside the range 20, the fault variable(s) are examined at 14 and their values are compared to the profile 19 to determine whether they are within the no fault range 22 of the profile or whether they fall outside the profile as indicating a fault state 24.

As mentioned above, the system of the invention can also be operated to discover a trusted variable. More particularly, the invention includes a technique for determining the reliability of a trusted variable for identifying a specific state of a target variable such as a variable believed to be effective for fault detection. The technique includes a statistical sampling of the trusted variable and the target variable. When plotted against the values of the trusted variable, the target variable should reveal a pattern of very low variance over some range of the trusted variable. In the examples given thus far, this low variance region of the observational pair (target variable, trusted variable) indicates a state in which no faults are present in the environment. In other domains, such a region may indicate a specific state of the environment under observation. If a low variance region does not appear in the plots either the trusted variable is faulty or the proposed measure is insufficiently related to the target state (or its inverse).

FIG. 5 shows a characteristic graph in which a trusted variable is effective at identifying a specific state of a fault detection variable. For example, as discussed in the Appendices hereto, with SNMP variables from computer networks, this type of graph is typically found to indicate a no fault state of the SNMP variable when the trusted variable is packet traffic volume. As shown in FIG. 5, plots of a potential trusted variable against each of the target variables will clearly display a pattern with a low variance region 30 on the target variable, e.g. a fault detection variable, when a trusted variable is effective. Such plots can be used to determine the reliability and indicative range of a potential trusted variable.

Figure 6:
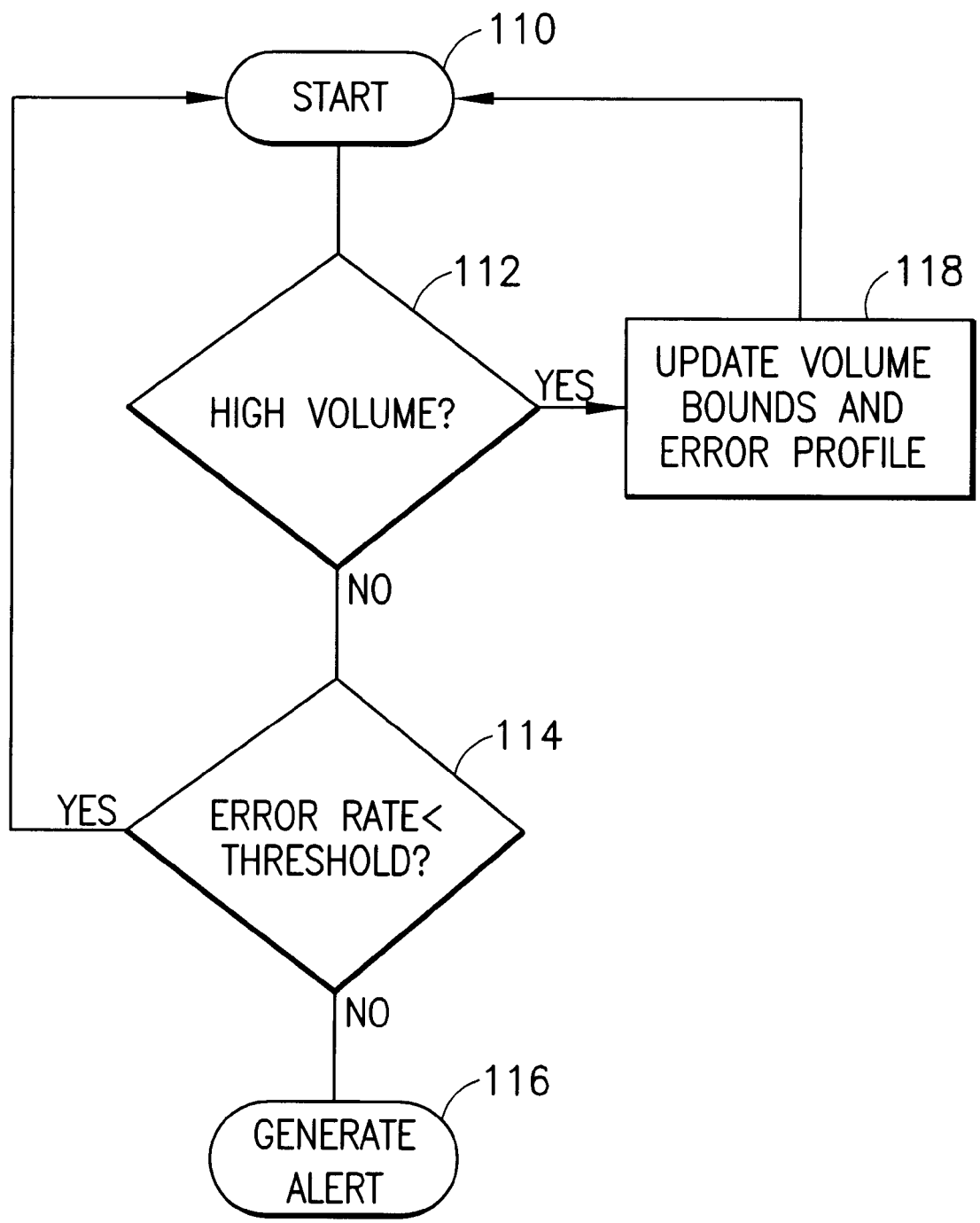
FIG. 6 is a simplified flow chart of the operation of the systems and methods of a first exemplary embodiment of the invention including adaptive profiling as applied in a communications network.

A first exemplary embodiment of the invention is illustrated in FIG. 6 and discussed in detail in the Appendices. FIG. 6 illustrates a system to detect faulty behavior of one or more devices in a communications network. The normal profile is built with data observations acquired during high processing volume, a condition discovered to be indicative of the absence of faults. One or more fault thresholds are derived from statistical profiles made from observations made during high volume conditions. It is readily recognized that, in this exemplary embodiment, low processing volume is not necessarily indicative of the presence of a fault. Thus, a fault alert is generated during lowered processing volume only when one of the normal profiled thresholds is exceeded.

As shown in FIG. 6, a data pair consisting of an observation of processing volume and a status variable are read at the start of the process at 110. Processing volume is compared at 112 against a threshold which defines high volume. If the data point is a high volume point, it is passed to a system component that uses the observation to update a profile of normal behavior for the error rate at 118. If the data point is not a high volume point, the status variable is passed to a system component that determines at 114 whether it represents normal behavior as defined by the current behavioral profile. If the observation does not fall within the system defined thresholds for normal behavior, an alert is generated at 116. The threshold that defines high processing volume may be setup at system initialization or it may be defined adaptively as data is observed.

A simple algorithm for updating processing volume adapts to reductions in device capacity by adjusting the maximum processing volume down if a data point in the highest $1/16$ of the volume range is not seen in a given time duration. This reduces the definition of high volume slowly but rapidly adjusts upward if a high volume point is seen. The code listing below assumes the minimum value for processing volume is zero.

function UpdateVolumeThreshold (observed_volume)
Const TIMELIMIT /* time interval for Upper $1/16$ obs
Static Int N /* number of values observed
Static Int MAX /* maximum volume observed
Static Int UQCUT /* cut point for upper quartile of volume range
Static Int UUQTIME /* time of last obs in upper $1/16$ of vol. range
If observed_volume>MAX then
    MAX=observed_volume UQCUT=0.75 MAX
End If
If observed_volume>UQCUT+0.75(MAX-UQCUT)
   UUQTIME=Now
Else if UUQTIME<Now—TIMELIMIT Then
   /* adjust quartile bounds to lower MAX
   /* simplest way is to reduce MAX and recompute UQCUT
   /* MAX will jump up on first high capacity observation
   MAX=UQCUT+0.75(MAX—UQCUT)
   UQCUT=0.75 MAX
End if
End Function A preferred embodiment of this implementation of the invention has been designed and tested for Internet Protocol (IP) layer fault detection in Simple Network Management Protocol (SNMP) compliant network devices (Internet RFC 1157). The SNMP standard requires that devices maintain statistics about their processing status and history as specified in the Management Information Bases I and II (MIB I and MIB II) (Internet RFC's 1156, and 1158) and the Remote Monitoring Management Information Base (RMON MIB) (Internet RFC 1757). The invention was tested using the MIB II variable ipInDelivers to measure processing volume. Other MIB II variables, e.g. ipInHdrErrors, ipInDiscards, ipFragFails, ipInAddrErrors, were used to measure device behavior.

A known mechanism was used to poll a target SNMP compliant network device and, optionally, transform raw data values. The polling mechanism queries the device to obtain values for the selected MIB II variable or variables, including ipInDelivers. It is important that the values for the behavioral variables are time synchronous, within a reasonable margin, with the value of ipInDelivers. For the SNMP embodiment, this was accomplished without difficulty by existing SNMP query mechanisms by querying the values of all required data together or immediately subsequent to one another. Although it is not necessary, data are normally read at regular time intervals.

In the preferred SNMP embodiment, data may be transformed prior to input to the fault detection of the invention. For example, it is desirable to smooth SNMP data over time. It does not matter how the data is smoothed so long as time synchronicity is maintained between ipInDelivers and the target behavioral variable. It was discovered that when median values are used to smooth the data, results are insensitive to the duration of the polling interval within the range of 1 minute to 30 minutes. It may also be desirable to aggregate the values of a number of primitive data observations. For example, an aggregate behavior variable can be constructed as a combination of MIB II variables, e.g., ipErrors=ipInHdrErrors+ipFragFails+ipInAddrErrors+ipInDiscards. In the SNMP embodiment it is also necessary to create rate variables from the raw input by dividing observed data by the time interval since the last observation.

The source code listing in Microfiche Appendix C gives an illustration of how the system operates. Processing begins when a data observation pair consisting of a measure of processing volume and a second measure of environment behavior, e.g. (ipInDeliversRate, ipErrorsRate), is input to the system. The system is composed of three functional modules, UpdateVolumeProfile, UpdateBehaviorProfile, and GenerateAlert, which read from and write to two data stores. The modules UpdatevolumeProfile and UpdateBehaviorProfile are used to update the system's model of normal device behavior as reflected in the selected measure of device behavior, e.g. ipErrorsRate. The module, GenerateAlert evaluates the input data observation and generates an output signal if warranted.

One data store, VolumeProfile, is used to store parameters that are needed to maintain a lower bound for identifying "high" processing volumes. The other data store, BehaviorProfile, stores parameters that are used to identify "normal" device behavior. Parameters in the data stores may be modified during system operation by the modules, UpdateVolumeProfile and UpdateBehaviorProfile.

In the preferred embodiment, the input data is either passed through the system without executing any module, passed through the two modules, UpdateVolumeProfile and UpdateBehaviorProfile, or passed into the single module GenerateAlert. The path a data observation takes depends on whether it is identified as having a high processing volume and on whether it is classified as an observation with "normal" behavior.

Two data stores, VolumeProfile and BehaviorProfile are used to record information needed to derive the system model of normal device behavior. VolumeProfile contains at least two numbers: the minimum value observed for ProcessingRate, and the maximum value observed for ProcessingRate. VolumeProfile may optionally include n storage areas where n is a parameter determined by the storage capacity available. These storage areas record information about past observations of the behavioral variable. This information is used to repair BehaviorProfile when the definition of "high" volume as specified by the model derived by VolumeProfile changes. When the definition of "high" volume changes, observations which had previously been included in the Behavioral model are now disallowed. The Behavioral model is repaired when these observations are removed from the computation of the profile.

According to a preferred embodiment, each of these storage areas contains at least three numbers. Two numbers represent a unique range of processing volumes and the third number records the sum of values of the behavioral variables observed in the range represented by the other two numbers. Together the storage areas should cover the range of processing volume currently defined by the model as "high" volume. When the definition of "high" volume advances to a higher range (preferably, it never declines) then the lowest k storage areas should be dropped (or used to further subdivide the covered range) and the info stored there used to repair the behavioral model.

The first step of the method used by the invention is to normalize data inputs with respect to processing volume to create a behavioral rate variable. Data inputs are normalized by dividing the behavioral measure by the processing volume measure. For the IP/SNMP embodiment, the behavioral variable, e.g. ipErrorsRate is divided by ipInDeliversRate to create a measure of error rate per delivered packet.

The normalized data observation is compared to the stored profile for the behavioral variable. For example, in a preferred embodiment for the IP/SNMP domain, the behavioral profile central value is the mean of the smoothed variable ipErrorsRate/ipInDeliversRate taken over a sample of selected values and the profile thresholds are integral multiples of the standard deviation taken over the same sample of observed data points for ipErrorsRate/ipInDeliversRate. If the data exceeds a threshold an alert signal is output by the system. Optionally the output signal may vary according to the threshold which was exceeded. For example, in a preferred IP/SNMP embodiment, multiples of the standard deviation of the normalized behavioral variable are used as thresholds. The signal output is the integer m such that, m<ipErrors/Std_Deviation(selected_ipErrors)<m+1
This is the number of the last threshold exceeded, as counted from the center value. It is an indicator of the severity of the fault which has been detected.

As mentioned above, every observation of processing volume is input to update the processing volume profile. In addition, every data observation pair is passed to the candidate evaluation module to determine whether it should be used update the profile of normal behavior. Candidate evaluation is much like anomaly detection except that the processing volume profile is used as a base of comparison. In the preferred IP/SNMP embodiment the profile central value is computed as the mean of those data observations that pass the candidate evaluation.

The systems and methods of the present invention can be applied in a number of different environments for fault detection and fault identification. In addition, the adaptive profiling aspects of the invention can also be applied in the monitoring and control of devices operating in changing environments. For example, the principles of the invention can be used to control the operation of a heart pacemaker.

It is desirable to control the heart rate of a pacemaker so that it corresponds to the normal heart rate of the individual when healthy, whether at rest or at different intensities of exercise. In devices designed to adjust the rate of a pacemaker, various measures of metabolic demand such as respiration rate, the QT interval, venous oxygen saturation, venous blood temperature, and minute volume have been used to control the pacing rate. Given a measure of metabolic demand such as those described above, it is necessary to map the sensed value to a metabolic indicated rate (MIR) to set the pacing interval for the pacemaker.

Pacemakers such as those described in U.S. Pat. No. 5,487,753 include a microprocessor with read-only memory (ROM) and random access memory (RAM) that are used to store the patient profile and control software. The microprocessor receives inputs from sense circuits that implement some measure of metabolic demand such as minute volume, uses the minute volume reading and the mapping profile to determine a pacing rate and send appropriate pacing pulses.

Minute volume has been a particularly useful measure of metabolic demand but there are difficulties mapping minute volume to the appropriate metabolic indicated rate (MIR) which is used to set the pacing interval. This mapping has been accomplished by adjusting a linear function that maps minute volume to the MIR with a rate response factor (RRF) that increases the rate of response for low exercise levels. Some pacemakers allow the RRF to be adjusted by a physician based on an evaluation of the patient according to age and general health. However, the use of a single RRF is inadequate because the response factor should vary according to the patient's exercise level, with higher slope for low levels of exercise and a more gradual slope for higher levels of exercise at a point where the patient's anaerobic threshold (AT) has been exceeded. Ideally a metabolic rate responsive pacemaker would dynamically respond to a patient's level of activity using a measure of metabolic demand and an appropriate mapping to MIR derived on an individual basis. A profile for the mapping could be identified experimentally for each patient if the intrinsic heart rate was measurable or deterministically related actual heart rate. However, the actual heart rate of a patient will vary depending on a wide range of factors including stress, food or drink recently ingested, level of fatigue, etc. In patients who require pacemakers, actual heart rates are particularly unreliable indicators of intrinsic heart rate because of pacing irregularities.

The systems and methods of the present invention also provide a method for profiling intrinsic heart rate so that the mapping from a measure of metabolic demand such as minute volume to the MIR determined pacing rate can be established empirically on an individual basis. In this way, a pacemaker can be made dynamically responsive to level of activity on an individual basis. Moreover, the profile used to determine the MIR determined pacing rate can be updated continuously so that it is responsive to longer term changes in the patient's general health and age. The method uses a trusted variable to determine when sensed measurements of actual heart rate and measured metabolic demand should be incorporated in a statistical profile that will determine a patient's individual mapping of measured metabolic demand, e.g. minute volume, to MIR. As in other applications of this method, the trusted variable is used to identify a subset of measured observations that can be known with a high degree of certainty to indicate normality. In this case, the invention utilizes a measure which will identify when a patient's actual heart rate is at a normal and stable pace for a given level of exercise. When determining the correct MIR (corresponding to an intrinsic heart rate) for a patient, a measure of heart beat regularity, taken over a recent window of beats, might be used as a trusted variable. For some patients who require pacemakers these measurements could be taken under test conditions in a physicians office with the pacemaker disengaged.

Figure 7:
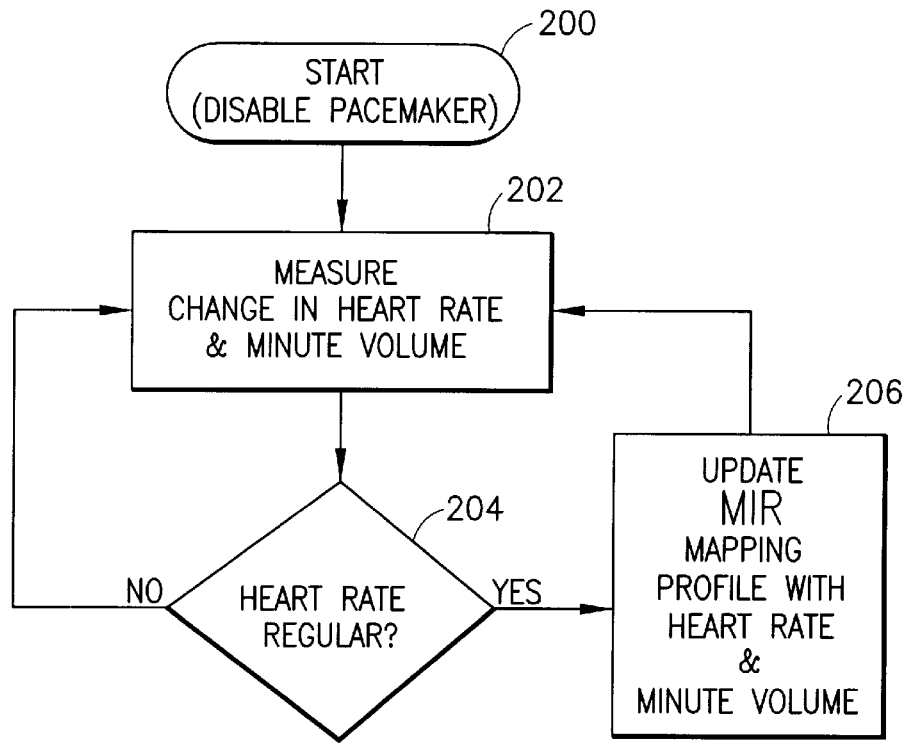
FIGS. 7 and 8 are simplified flow charts of the operation of the systems and methods of a second embodiment of the invention as applied to controlling the rate of a pacemaker.

FIG. 7 shows a flow chart for updating of the metabolic_demand-to-MIR mapping profile used to set the pacing interval of a pacemaker. Here it is assumed that the pacemaker has been disabled at 200 for the purposes of building the mapping profile. A measure of regularity of the patient's heart rate is determined at 202 by evaluating the change in heart rate over the previous n sampled observations, and is used as the trusted variable. Here the trusted variable indicates when the measured heart rate corresponds to the intrinsic rate. When the trusted variable indicates that the observed heart rate corresponds to the intrinsic rate at 204, the system accepts the measured observation for metabolic demand, e.g. minute volume, and the measured observation for heart rate and uses these to update the mapping profile at 206.

For continuous updating of the mapping profile as the patient goes about his normal activity, the trusted variable could not be based on heart rate as this is controlled by the pacing device. In the presence of an operating pacemaker, a trusted variable would need to be identified that would accurately identify the states in which the patient's heart rate is correctly paced. Continuous updating of the mapping profile, as the patient goes about his normal activities with the pacemaker enabled, can be accomplished if a trusted variable is found to accurately detect situations in which the pacing device is set correctly at the intrinsic heart rate. Other potential trusted variables could include measures that can be used to identify the correct intrinsic heart rate such as the change in the QT interval, change in venous oxygen saturation, the patient's or physician's assessment, or some combination of these.

Figure 8:
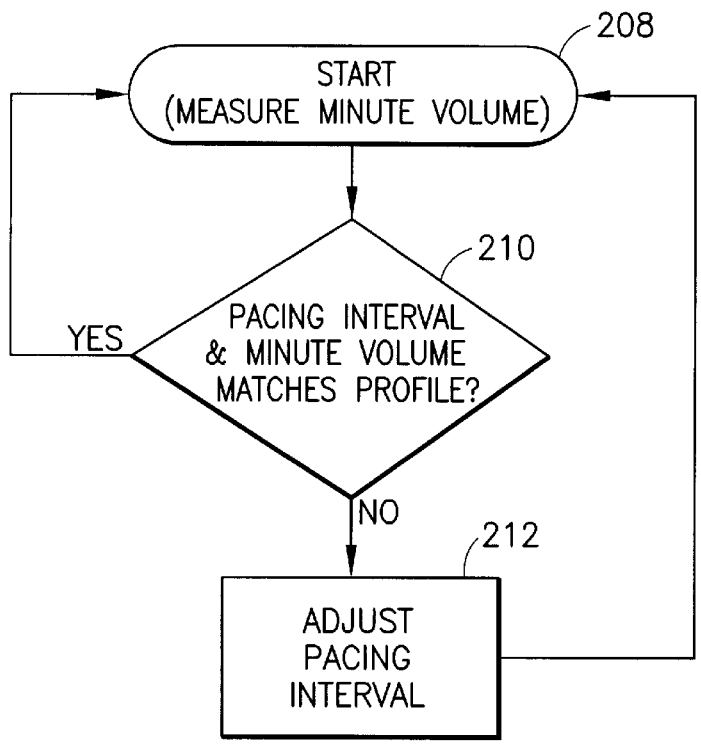

FIG. 8 shows how the MIR mapping profile computed in the manner of this invention is used to control a pacemaker device similar to that described in U.S. Pat. No. 5,487,753. This includes means for evaluating sensed input and controlling the pacing pulse. The selected measure of MIR, in this case minute volume, is measured at 208. If the interval indicated in the mapping profile does not match the current pacing interval at 210 the pacing interval is adjusted at 212 to the correct interval as recorded in the mapping profile for the corresponding minute volume.

The systems and methods of the invention may be applied in the environment of an internal combustion. For example, detection of combustion irregularities such as misfires and partial combustion in a internal combustion engine can be indicative of many types of problems such as poor grade fuel, incorrect fuel/air mixture, faulty ignition means, or misaligned valves. Detection of misfires has been important in order to improve diagnosis of engine performance and to prevent damage to catalytic exhaust systems. The prior art has sought to identify engine misfires by sampling a measure of engine speed and comparing engine speed to an average speed considered over many cycles or by determining the angular velocity of the engine. The average of these samples is then compared to a fault threshold to determine whether the engine as a whole, or, in some methods, a particular cylinder, is experiencing a faulty combustion cycle. However, the prior art generally does not include a method for automating the setting of fault thresholds that are used to determine whether misfires have occurred. These are assumed to be predetermined and stored in ROM memory attached to a microprocessor device that carries out the sampling and analysis. Moreover, it is usually necessary to equip the vehicle with an accelerometer or displacement transducer to invalidate fault detection in the "transient phases", e.g. during acceleration, and under changing load, e.g. during travel on a rough road.

U.S. Pat. No. 5,505,079 describes a system and device for making a combustion diagnosis by measuring time intervals between angular variations in the crank shaft, determining a set of parameters that represent variation in instantaneous speed of the engine at the moment of combustion, and comparing these parameters with a fault threshold. In that system and device, the fault threshold is determined in advance by simulations under controlled settings. U.S. Pat. No. 5,574,217 describes an alternative system in which separate fault thresholds are predetermined for combinations of engine speed, change in engine speed, and manifold pressure in order to avoid incorrect fault detection for transient states. That method also assumes that fault thresholds are predetermined.

Figure 9:
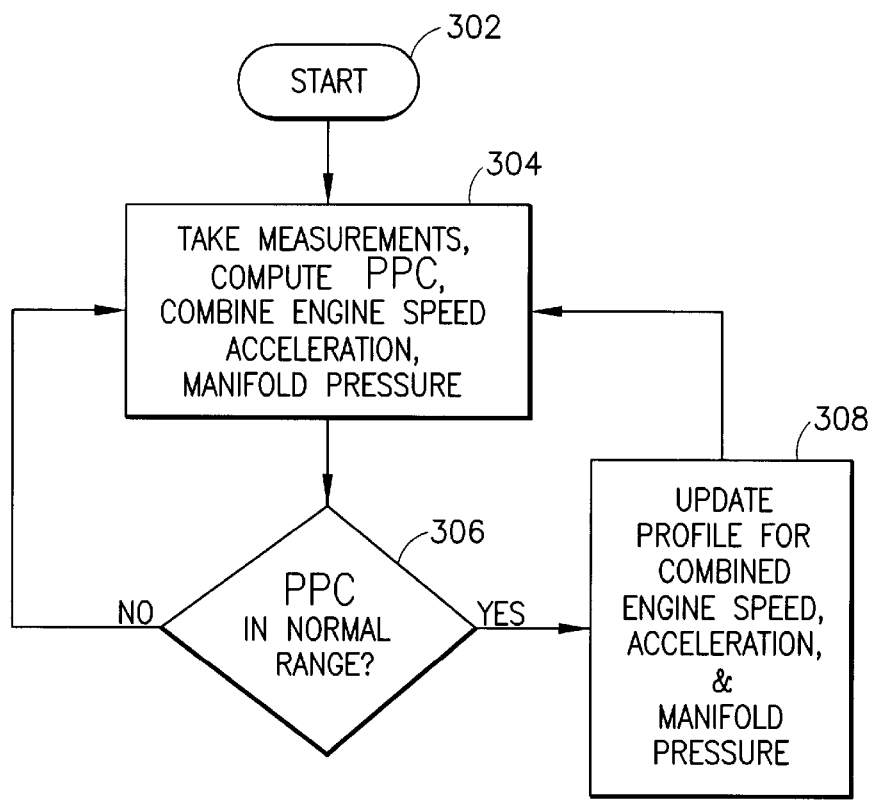
FIG. 9 is a simplified flow chart of the operation of the systems and methods of a third embodiment of the invention as applied to updating the profile of normal operating conditions in an internal combustion engine.

The present invention provides a means for automatically computing and continuously updating profiles of normal behavior for a measure of angular velocity and for automatically determining fault thresholds that may be dependent upon other indicators of the state of the engine such as engine speed, engine acceleration, manifold pressure or other appropriate measures. Using a trusted variable that indicates normal operation for each cylinder such as the Percent Power Contribution Parameter described in U.S. Pat. No. 5,446,664, sampled measurements for a combination of engine speed, change in engine speed, and manifold pressure can be collected only during cycles or normal operation and a profile of normal behavior can be constructed that takes each combination of these variables into account. One way to compose the three measures into a single fault variable would be to use a weighted average of the values of each variable. The fault threshold for the combined variables can be computed using the standard deviation of the combined variable as described in earlier discussions. Moreover, the reliability of the proposed trusted variable, such as Percent Power Contribution (PPC), can be determined by graphing the combined fault detection variable against the proposed trusted variable. FIG. 9 shows a flow diagram that uses a linear combination of the engine speed, engine acceleration, and manifold pressure as the fault detection variable. When the system starts at 302, measurements are taken of engine speed, acceleration and manifold pressure, and the PPC is computed at 304. If it is determined at 306 that the PPC is in the normal range, the profile for engine speed, acceleration and manifold pressure is updated at 308. Otherwise, measurements continue at 304. In this way an accurate profile of normal conditions can be built according to the invention.

Figure 10:
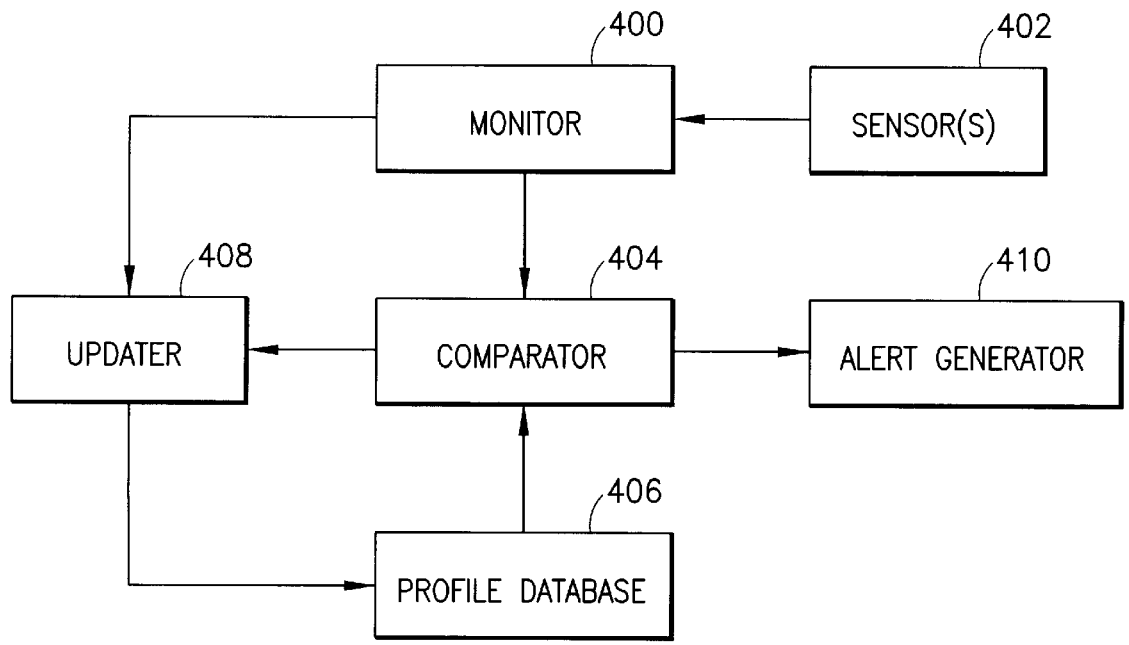
FIG. 10 is a simplified block diagram of a hardware system for implementing the methods of the invention.

Those skilled in the art will appreciate that the systems and methods of the invention can be implemented in many different ways using different types of hardware and software. FIG. 10 shows the basic components of a system for implementing the methods of the invention. The system includes a monitor 400 for acquiring data about the environment. These data are usually supplied by one or more sensors 402. The acquired data are passed to a comparator 404 which compares the present value of data samples to the profile of normal behavior which is contained in a database 406. If the data is within the normal profile, an updater 408 updates the profile database 406. This, the updater 408 also receives the data from the monitor 400 and when directed by the comparator 404, uses the present data to update the profile database 406. If the comparator 404 determines that the data samples lie outside the normal profile, it sends a signal to an alert generator 410 to generate a fault alert. As mentioned above, other action may be taken in lieu of generating an alert. In addition, other comparators may examine the data to diagnose the condition of the environment.

There have been described and illustrated herein several embodiments of systems and methods for adaptive profiling, fault detection, and alert generation in a changing environment. While particular embodiments of the invention have been described, it is not intended that the invention be limited thereto, as it is intended that the invention be as broad in scope as the art will allow and that the specification be read likewise. Thus, while particular application of the invention to several environments have been disclosed, it will be appreciated that the systems and methods described herein may find useful application in other environments. It will therefore be appreciated by those skilled in the art that yet other modifications could be made to the provided invention without deviating from its spirit and scope as so claimed.

What is claimed is:

1. A method for detecting a first state of an environment which is measurable by at least two different measures of state, said method comprising:

a) identifying a first measure of the state of the environment, the first measure being capable of indicating that the environment is not in the first state;

b) identifying a second measure of the state of the environment, the second measure being capable of indicating that the environment is in the first state;

c) building a profile over time of values of the second measure using samples taken only when values of the first measure indicates that the environment is not in the first state; and d) monitoring the environment over time to determine whether values of the second measure deviate from the profile.

2. A method according to claim 1, wherein:

said step of monitoring includes sampling values of the first measure over time and determining whether a value of the second measure deviates from the profile only after first determining that a sampled value of the first measure does not indicate that the environment is not in the first state.

3. A method according to claim 2, wherein:
the second measure includes a plurality of second measures,
said step of building includes building a profile over time of values of each of the plurality of second measures, and
said step of determining includes determining whether any of the values of the plurality of second measures deviates from the profile.

4. A method according to claim 3, wherein:
said step of determining includes determining which of the plurality of second measures has a value which deviates from the profile.

5. A method according to claim 1, wherein:
said step of building is continuously performed while performing said step of monitoring.

6. A method according to claim 1, wherein:
the environment is a communications network,
the first state is a fault in the network, and
the first measure i s a high level of network traffic which indicates that there is no fault in the network.

7. A method according to claim 1, wherein:
said steps of identifying the first and second measures includes statistically sampling potential first and second measures and determining whether the potential second measure exhibits a pattern of low variance over a range of the potential first measure.

8. A method according to claim 1, wherein:
the first measure includes a plurality of first measures.

9. A system for detecting a first state of an environment which is measurable by at least two different measures of state, said system comprising:
a) database means for storing a value range of a first measure of the state of the environment, said value range of the first measure being indicative that the environment is not in the first state, and said database means for storing a profile of values of a second measure, said values of the second measure having been sampled only when values of the first measure indicate that the environment is not in the first state;
b) monitoring means for repeatedly sampling values of the second measure;
c) comparator means for comparing sampled values of the second measure to said profile of values of the second measure to determine whether a sampled value of the second measure deviates from said profile of values of the second measure.

10. A system according to claim 9, wherein:
said monitoring means includes means for repeatedly sampling values of the second measure,
said comparator means includes means for comparing sampled values of the first measure to said value range of the first measure to determine whether a sampled value of the first measure deviates from said value range of the first measure, and wherein
said comparator means compares sampled values of the second measure to said profile of values of the second measure only after first determining that a sampled value of the first measure deviates from said value range of the first measure.

11. A system according to claim 9, wherein:
the second measure includes a plurality of second measures,
said database means includes means for storing a profile of values of each second measure, said values of each second measure having been sampled only when values of the first measure indicate that the environment is not in the first state, and
said comparator means includes means for comparing sampled values of each second measure to said profile of values of each respective second measure to determine whether a sampled value of a second measure deviates from said profile of values of the respective second measure.

12. A system according to claim 11, wherein:
said comparator means includes means for determining which of said plurality of second measures has a value which deviates from said profile of values of the respective second measure.

13. A system according to claim 9, further comprising:
d) updating means for updating said profile of values in said database means only when values of the first measure indicate that the environment is not in the first state.

14. A system according to claim 9, wherein:
the environment is a communications network,
the first state is a fault in the network, and
said first measure is a high level of network traffic which indicates that there is no fault in the network.

15. A system according to claim 9, wherein:
said first and second measures are statistically related in that said second measure exhibits a pattern of low variance over a range of said first measure.

16. A system according to claim 9, wherein:
said first measure includes a plurality of first measures.

17. A system for detecting faults in a communications network, said system comprising:
a) database means for storing a value range of a network traffic volume within which range the likelihood of a fault in the network is low, and said database means for storing a profile of values of a measure of the network which is capable of indicating a fault, said values of the measure having been sampled only when network traffic volume was within said value range;
b) monitoring means for repeatedly sampling values of the measure;
c) comparator means coupled to said database means and to said monitoring means for comparing sampled values of the measure to said profile of values of the measure to determine whether a sampled value of the measure deviates from said profile of values of the measure.

18. A system according to claim 17, further comprising:
d) alert generation means coupled to said comparator means for indicating when a sampled value of the measure deviates from said profile of values of the measure.

19. A system according to claim 17, further comprising:
e) updater means coupled to said comparator means, said monitoring means and said database means for updating said profile of values when a sampled value of the measure does not deviate from said profile of values of the measure.

20. A system according to claim 19, wherein:
said updater means continuously updates said profile over time when sampled values of the measure does not deviate from said profile of values of the measure.

* * * * *